(12) United States Patent
Gilmour

(10) Patent No.: US 8,231,794 B2
(45) Date of Patent: Jul. 31, 2012

(54) WATER FILTRATION SYSTEM

(75) Inventor: Jason D. Gilmour, Huntington Beach, CA (US)

(73) Assignee: SpinTek Filtration, Inc., Los Alamitos, CA (US)

( * ) Notice: Subject to any disclaimer, the term of this patent is extended or adjusted under 35 U.S.C. 154(b) by 528 days.

(21) Appl. No.: 12/166,057

(22) Filed: Jul. 1, 2008

(65) Prior Publication Data
US 2009/0008343 A1 Jan. 8, 2009

Related U.S. Application Data

(60) Provisional application No. 60/958,400, filed on Jul. 5, 2007.

(51) Int. Cl.
*B01D 37/00* (2006.01)
*B01D 29/62* (2006.01)
*B01D 29/66* (2006.01)

(52) U.S. Cl. ............... 210/791; 210/411; 210/425

(58) Field of Classification Search ............. None
See application file for complete search history.

(56) References Cited

U.S. PATENT DOCUMENTS

| | | |
|---|---|---|
| 4,806,217 A | 2/1989 | Rosenberg |
| 5,348,647 A | 9/1994 | Chen |
| 6,861,033 B2 | 3/2005 | Mullins et al. |
| 2006/0175270 A1* | 8/2006 | Greene .................. 210/798 |
| 2009/0008343 A1* | 1/2009 | Gilmour .................. 210/791 |
| 2010/0078395 A1* | 4/2010 | Shevitz .................. 210/808 |

FOREIGN PATENT DOCUMENTS

WO  WO 2009/005829 A1 *  1/2009

OTHER PUBLICATIONS

IPER of Jan. 5, 2010, 5 Pages.*

* cited by examiner

*Primary Examiner* — Robert James Popovics
(74) *Attorney, Agent, or Firm* — Leon D. Rosen

(57) ABSTRACT

A water filtration system (60, FIG. 2) wherein pressured feed water (water with impurities to be filtered out) passes downstream from an upstream end of a passage (66) through a filter arrangement (74) in the passage, to a filtrate storage region (82), during filtrate production. Pressured water, such as at 50 psi (3 bars) from a tap water source (110), provides the pressured feed water during filtrate production, and also pressurizes the filtrate during backflushing. A filtrate pressurizing apparatus (90) includes a movable member or piston (92) that lies in a chamber (94), and that has a feed side (134) that is pressurized by tap water during a backflush and that has a filtrate side (132) that presses against filtrate, the feed side having a larger diameter (D2) than the filtrate side (D1) to produce an increased pressure during backflushing.

5 Claims, 2 Drawing Sheets

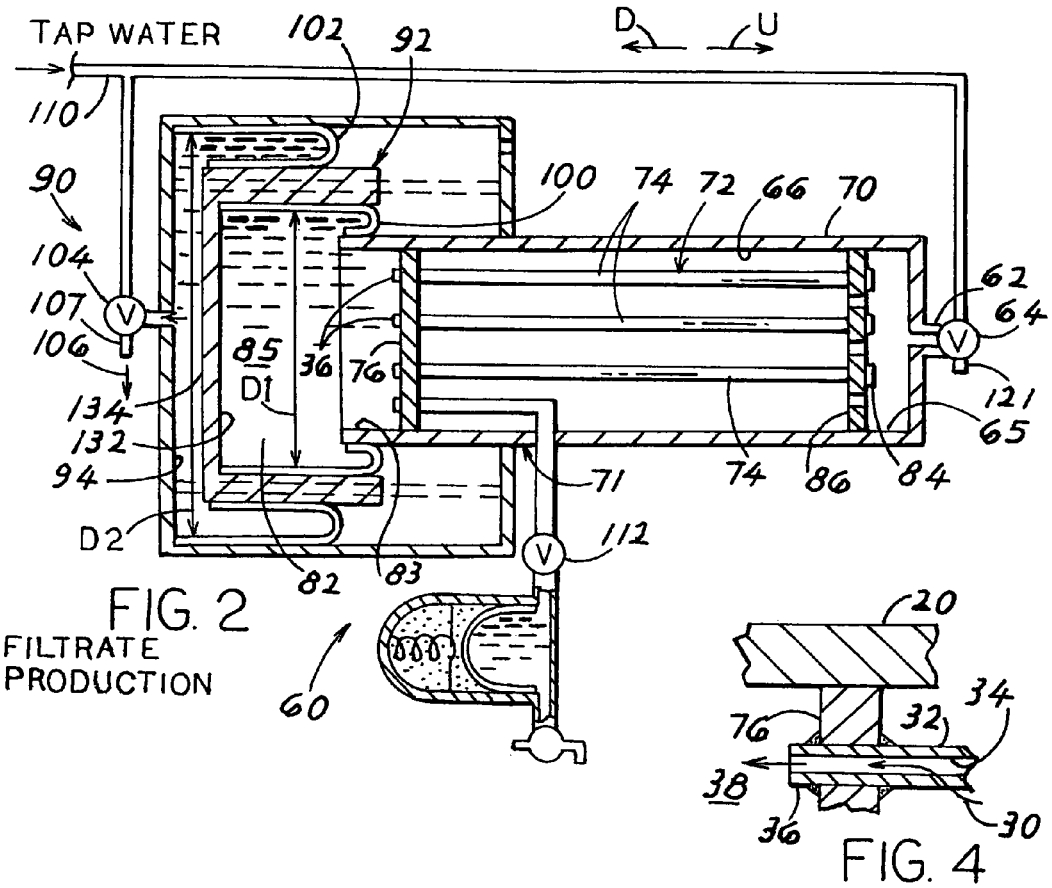
FIG. 2 FILTRATE PRODUCTION
FIG. 4
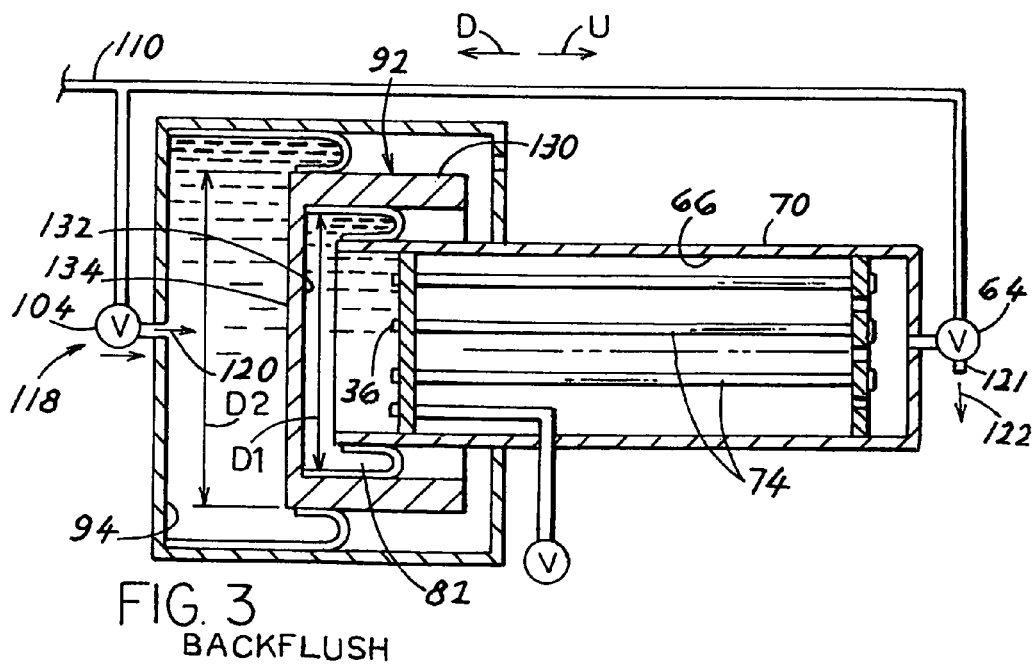
FIG. 3 BACKFLUSH

WATER FILTRATION SYSTEM

CROSS-REFERENCE

Applicant claims priority from U.S. Provisional Patent Application Ser. No. 60/958,400 filed Jul. 5, 2007.

BACKGROUND OF THE INVENTION

Feed water, which is water with impurities, can be purified in a household or other local environment, by pressurizing the feed water to force it downstream through a filter arrangement. The resulting filtrate flows into a filtrate storage region. The filter arrangement may comprise a bundle of tubes of filtering material with water passing through the tube walls between the tube outside and inside. The tube material has pores that become clogged with microscopic particles during filtering. The filter tubes can be unclogged by backflushing, wherein a portion of the filtrate is forced in a reverse direction, or upstream direction, through the filtering material, with the backflushed water dumped into a drain. One type of filtering system includes a stretchable bladder that lies in the filtrate storage region, with filtrate on one bladder face and with pressured air on the other bladder face. As filtrate enters the filtrate storage region, the membrane deflects and compresses the air. The pressured air will later press the filtrate in an upstream direction during the next backflushing. One problem encountered with this arrangement is that the backflushing pressure may be lower than desirable, and decreases as backflushing proceeds. Another problem encountered is that the pressure differential across the filter arrangement may be lower than desirable, and decreases as filtering proceeds and bladder air pressure increases. A filtering system that produced constantly high pressure during filtering and during backflushing, would be desirable. It also would be desirable if a backflush pressure could be applied that was even higher than the pressure applied during filtrate production.

SUMMARY OF THE INVENTION

In accordance with one embodiment of the present invention, a water filtering system is provided that generates a high and primarily constant pressure during backflushing and a high and primarily constant pressure during filtrate production. Instead of constantly increasing pressure in the filtrate storage region during the filtering of feed water, the filtrate is maintained at a low pressure in the filtrate storage region. The high pressure across the filter arrangement (e.g. filter tubes) during filtrate production, can be obtained from a high pressure source such as a tap water source at perhaps 50 psi (3 bars). This results in a constant high pressure differential across the filter arrangement, that increases the rate of filtrate production. When backflushing is to occur, the tap water source at perhaps 50 psi is coupled to the filtrate storage region to produce a high backflush pressure.

An even more complete backflush can be obtained by the use of a pressurizing apparatus that applies an even higher backflush pressure than the tap water pressure. The pressurizing apparatus includes a movable member such as a piston, that has a large diameter downstream end that is pressurized by tap water pressure, and that has a smaller diameter upstream end that presses against filtrate in the filtrate storage region. A separate filtrate supply region can be provided from which filtrate can be withdrawn for use at any time.

The novel features of the invention are set forth with particularity in the appended claims. The invention will be best understood from the following description when read in conjunction with the accompanying drawings.

DESCRIPTION OF THE DRAWINGS

FIG. 2 is a sectional view of a water filtration system of one embodiment of the present invention, shown during filtrate production.

FIG. 3 is a sectional view of the system of FIG. 2, but showing the system during backflushing operation.

FIG. 4 is an enlarged sectional view of one of the filtering tubes of the system of FIG. 2.

DESCRIPTION OF THE PREFERRED EMBODIMENTS

Figure 1:
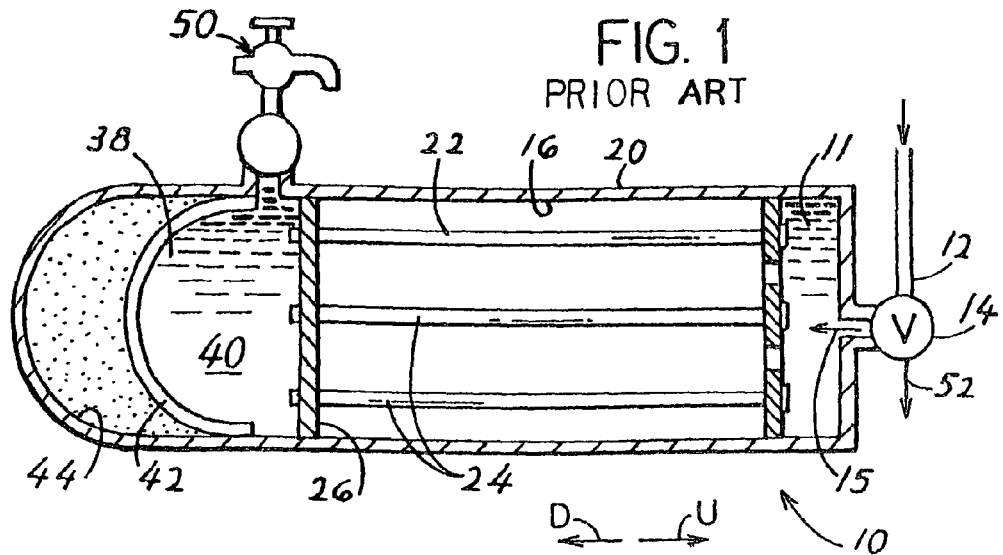
FIG. 1 is a sectional view of a water filtration system of the Prior Art.

FIG. 1 shows a prior art water filtration system 10 wherein feed water 11, which is water that is to be filtered, is applied under pressure to a feed inlet 12. A valve 14 directs the feed water along path 15 into a passage 16 of a duct 20. A filter arrangement 22 lies in the duct, and includes a large number of filter tubes 24, and a barrier 26. The barrier 26 prevents the downstream D movement of feed water unless the feed water first passes from the outsides of the filter tubes 24 to their insides. FIG. 4 shows feed fluid flowing along arrow 30 from the tube outside 32 to the tube inside 34. Water that has passed into the tubes exit from the tube downstream ends 36 as filtrate, and passes into a filtrate storage region 38. The filtrate 40 (FIG. 1) in storage region 38 is under pressure, and deflects a bladder 42 progressively downstream D. A sealed chamber 44 containing air lies downstream of the bladder, and air pressure in the chamber increases as the region 38 fills with filtrate. Filtrate can be withdrawn by a consumer who may wish to drink it, through a faucet 50.

After a sufficient quantity of filtrate has been produced, pores of the filter tubes may be clogged with particles. The valve 14 is operated to direct feed water upstream U from the passage 16 along path 52 into a drain to dispose of it. The pressure of air in the chamber 44 moves the bladder upstream U to push filtrate upstream into the passage 16. During such backflushing, filtrate from region 40 passes into the inside of the filter tubes 24 so the filtrate flows through the tube walls into the passage 16 and then to the drain. The filtrate flushes particles from the pores of the filter tubes. Fluid in the passage includes feed fluid that was present at the time backflushing began, and filtrate and dislodged particles. The backflushing can continue only until filtrate in region 40 is gone. The pressure of filtrate 40 applied during backflushing, gradually decreases as the bladder 42 returns toward its original undeflected position. Applicant notes that the terms "upstream U" and "downstream D" refer to the flow of water toward or away from the valve 14, and there could be right angled sections of the passages, etc.

FIG. 2 shows a water filter system 60 of the invention, which includes a feed inlet 62 that receives pressured feed water. A valve 64 directs the feed water into the feed inlet to flow into the upstream end portion 65 of a passage 66 of a duct 70 of a housing 71. A filter arrangement 72 lies in the duct, and includes a large number of filter tubes 74 and a barrier 76. Feed water passes through the passage and to the outside of the filter tubes, and migrates through the walls of the tubes to the inside of the tubes (along path 30 in FIG. 4). Water emerging from the downstream ends 36 of the filter tubes is filtrate 85, which flows from the downstream ends 36 of the tubes and the duct downstream end portion 83 into a filtrate storage region 82. Applicant notes that the tubes have upstream ends 84 that are blocked, and feed water can pass through a support 86. Even if the tube downstream ends extend downstream beyond the duct, filtrate would be flowing from the duct downstream end portion into the storage region.

A filtrate pressuring apparatus or means 90 lies at the downstream end portion of the system. It includes a moveable member or piston 92 that moves in downstream D and upstream U directions within a chamber or container 94 of the housing 71. Applicant uses the term "piston" to refer to a moveable member with opposite faces that are sealed from each other. The piston can be sealed by o-rings, flexible barriers, or other means. The piston 92 is sealed to the duct 70 by a first seal 100, and the piston is sealed to the inside of the container by a second seal 102. Both seals are shown as being in the form of elastic sheets. The piston is pushed downstream D by filtrate entering the storage region 82. Water lying in the container downstream of the piston, exits the container through a valve 104 which directs it along the path of arrow 106 through a drain pipe 107 to a drain. Since no appreciable pressure (of more than a few psi) is accumulated behind (downstream D) of the piston or behind the filtrate storage region 82, a high portion of the pressure of feed water applied to the feed inlet 62 is applied across the filter tubes for a higher volume of filtrate production than previously. In one example for a tap water pressure of 50 psi (3 bars), the pressure drop of 50 psi across the system includes a pressure drop of 40 psi across the walls of the filter tubes.

The pressured feed fluid is obtained from a tap water supply or source 110. Such a source commonly supplies water at a pressure on the order of magnitude of 50 psi (5 to 500 psi). As the filtrate storage region 82 fills with water, water is occasionally removed through a valve 112 to a dispenser 114 where a bladder 116 applies low pressure (e.g. a few psi) to the water (the pressure can be obtained by an elastic bladder and/or a spring 117).

When it is necessary to backflush the system, a valve arrangement 118 is operated, the valve 112 leading to the dispenser is closed, and the valves 104 and 64 are switched. The valves can be operated manually or electrically by a controller. As shown in FIG. 3, switching of valve 104 results in flow from the tap water source 110 along arrow 120 into the container 94 to a location immediately behind, or downstream of the piston 92 to push the piston upstream U. Switching of the inlet valve 64 causes water to move upstream U through the passage 66 to pass through the valve 64 and along a drain pipe 121 and along path 122 to a drain. As mentioned above, the tap water source may apply a pressure of about 50 psi to the container 94 to push the piston upstream and force filtrate that lies in the filtrate storage region 82 into the downstream ends 36 of the filter tubes 74. The filtrate is forced to migrate from the tube insides to their outsides and into the passage 66, from which the filtrate, feed water previously left in the passage, and particles that clogged the tubes, flow through the valve 64 to the drain. After sufficient backflushing, the filtrate method of FIG. 3 starts again.

When backflushing begins, filtrate is forced upstream U by the pressure of about 50 psi of the tap water. Most of this pressure is "used up" as the filtrate flows from the inside of each filter tube to the outside of the tube. The large pressure drop across the filter tubes allows for a vigorous and more effective cleaning of the filter tubes. The backflush pressure does not decrease as the piston 92 moves upstream U, so the vigorous cleaning continues throughout flushing.

FIG. 3 shows that the movable member, or piston 92 has thick walls 130, with the piston upstream, or filtrate side 132 sealed at a diameter D1 to the stationary duct 70, and with the downstream side 134 of the piston sealed at a larger diameter D2 to the stationary container 94 which is fixed to the duct. This difference in diameters results in the piston applying pressure to filtrate in the storage region 82 with a pressure of about $(D2/D1)^2$ times the tap water pressure. A better cleaning of the pores of the filter tubes is achieved by applying a higher pressure differential during backflushing than during filtrate production, and the present system accomplishes this while using the same amount of filtrate. In one example, where the tap water pressure is 50 psi and the ratio of diameters D2/D1 is 1.25, the back pressure applied to the filtrate is 78 psi.

Figure 5:
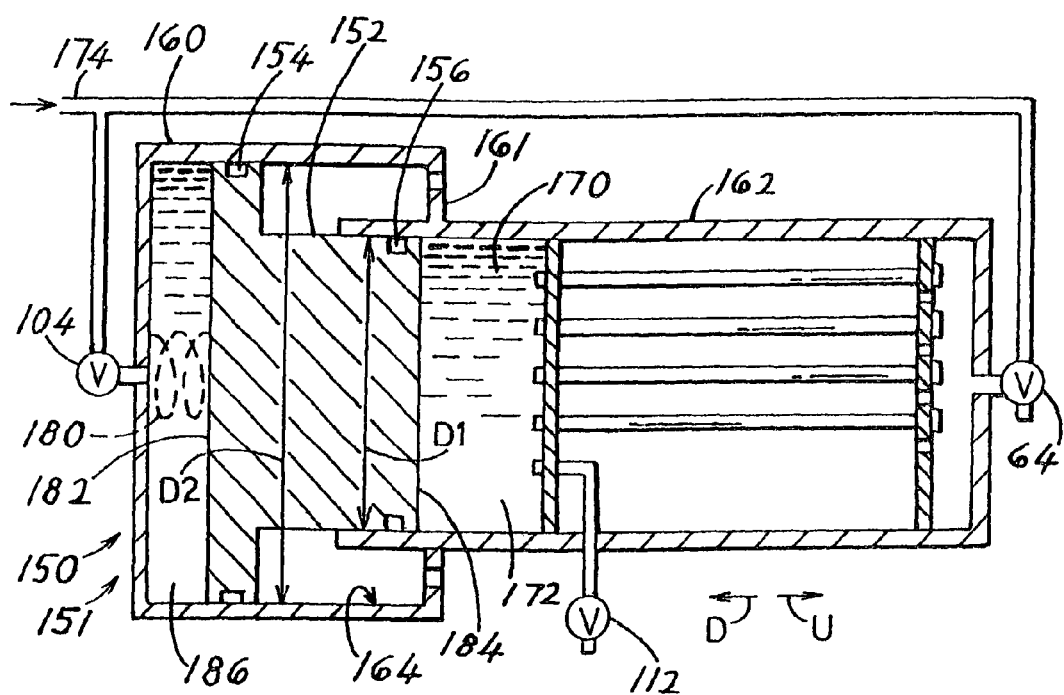
FIG. 5 is a sectional view of another embodiment of the invention wherein the movable member is sealed by O-rings.

FIG. 5 illustrates another system 150 which is similar to that of FIGS. 2 and 3, but it includes another pressure enhancing means 151 that supplies a higher backflush pressure. The pressure enhancing means includes a piston 152 that is sealed by O-rings 154, 156, respectively to the container 160 and to the duct 162. The container and duct are part of the same housing 161. The container inner wall surface 164 has a diameter D2, while the duct inner wall surface 166 has a diameter D1 which is smaller than D2. This results in a larger pressure being applied to filtrate 170 in the filtrate storage region 172 than the pressure of feed water at source 174 that was initially used to pressurize the filtrate. If a large amount of filtrate is to be withdrawn from the storage region 172 before a backwash, a spring 180 can be used to apply a small force (e.g. equivalent to 2 psi) to a pressurizing region 186 that is formed by the container and the downstream face 182 of the moveable member 152, opposite its upstream face 184, and filtrate can be withdrawn from the container through valve 112.

Thus, the invention provides water filtration systems with backflushing, which enables a high pressure differential to be applied across the filter elements such as filter tubes during filtrate production, because a large pressure does not build up in the filtrate storage region during filtrate production. During backflushing, the filtrate that backflushes is pressured by the same high pressure feed water source that is used to force feed water through the system during filtrate production. This assure a constant high backflush pressure. The backflush pressure can be increased to above the pressure used during filtrate production, by a piston that has an upstream end over which feed fluid is pressurized by the piston. The piston downstream end is sealed at a larger diameter D2 than the diameter D1 at the piston upstream end over which pressure is applied to the fluid being backflushed.

Although particular embodiments of the invention have been described and illustrated herein, it is recognized that modifications and variations may readily occur to those skilled in the art, and consequently, it is intended that the claims be interpreted to cover such modifications and equivalents.

What is claimed is:

1. A method for operating a water filtering system that includes a feed input (62) that receives pressurized feed water from a pressured feed source (110) and that allows the pressured feed water to flow downstream through a passage (66) that holds a filter (72) to produce clean water, or filtrate (85) during filtrate production and that retains some of the filtrate in a storage region (82), and that, during a backflush, applies pressure to filtrate in said storage region to flow filtrate upstream through the filter, wherein said system includes walls forming a confined volume (94) and a moveable member (92) in said confined volume, said moveable member having a downstream face, and with an upstream face (132) of said moveable member exposed to the pressure of filtrate in said storage region, wherein:

during a backflush operation, stopping the flow of said feed fluid to said feed input (62) and applying pressured feed fluid from said source to said downstream face (134) of said moveable member, to move said moveable member against filtrate in said storage region;

said step of applying feed fluid to said downstream face during a backflush operation includes applying said feed fluid to a downstream face of a rigid moveable member which has a downstream end periphery that is sealed to stationary walls of said confined volume around a first area and that has an upstream end periphery that is sealed to said stationary walls around a second area that is smaller than said first area, to thereby increase the backflush pressure applied to said filtrate in said storage region.

2. A water filtration system (60, 150) that includes a feed input (62) and walls forming a filtrate storage region (82), walls forming a passage (66) with an upstream end portion (65) connected to said feed input and a downstream end portion (83) connected to said filtrate storage region, a filter arrangement (72) lying in said passage and allowing only filtrate to flow through said passage to said storage region, comprising:

a moveable member, or piston (92) that lies in a container (94), said piston having an upstream face (132) forming a wall of said storage region and having a downstream face (134) forming a container wall;

a feed water supply (110, 174) that supplies feed water at a pressure on the order of magnitude of 50 psi;

a valve arrangement (118) that connects said feed water supply to said feed input (62) during filtrate production to flow feed water into said passage upstream end portion (65) and through said filter arrangement to move the piston downstream (D) and store filtrate against said piston upstream face (132), said valve arrangement coupling said feed water supply to said piston downstream face (134) during a backflush to push said piston upstream (U) and thereby force said filtrate in reverse through said filter arrangement;

said feed water supply includes pressure-enhancing means (90, 151) that pressurizes filtrate during a backflush, at a pressure greater than the pressure of said feed water supplied by said feed water supply to said passage upstream end portion during filtrate production.

3. The system described in claim 2 wherein:

said piston has upstream and downstream faces with said downstream face (134) sealed to said container at a second diameter (D2) and with said upstream face (132) sealed to said container at a first diameter (D1) that is smaller than said second diameter, said piston downstream face (134) being exposed to said pressured feed fluid over said second diameter and said piston upstream face (132) being exposed to filtrate in said filtrate storage region over said first diameter.

4. A water filtration system with walls forming a passage (66) having upstream and downstream end portions (65, 83), a filter arrangement (72) lying in said passage and positioned to filter water passing between said end portions to produce filtrate (85) during filtrate production, a pressured feed water supply (110) coupled to said passage upstream end portion to supply pressured feed water to be filtered thereto during feed water movement through said filter arrangement in said passage and produce filtrate, walls forming a filtrate storage region (82) coupled to said passage downstream portion for accumulating filtrate, and a filtrate pressurizing apparatus (90) coupled said filtrate storage region for pressurizing said filtrate to backwash said filter arrangement, wherein:

said filtrate pressurizing apparatus includes walls forming a container (94), a moveable member (92, 152) lying in said container and having an upstream side (132) exposed to said filtrate and a downstream side, and a valve arrangement that controls the flow of feed water from said pressured feed supply;

said valve arrangement is operable during a backflush to stop the flow of feed water from said supply into said passage upstream end portion (65) while allowing feed water to flow into said container (94) against said downstream side of said movable member, to push said movable member upstream and force the flow of said filtrate upstream through said passage and said filter arrangement, while connecting said passage upstream portion to a drain (121);

said system includes pressure-enhancing means that pressurizes filtrate at said filtrate side (132) of said moveable member during a backflush, at a pressure greater than the pressure of said pressured feed water supplied by said supply to said downstream side (132) of said moveable member.

5. The system described in claim 4 wherein:

said moveable member has upstream and downstream end portions with said upstream end portion sealed -to said container at a first diameter and with said downstream end portion sealed to said container at a second diameter that is larger than said first diameter, said moveable member being exposed to said pressured feed fluid over said second diameter and said moveable member being exposed to filtrate in said passage downstream end portion over said first diameter.

* * * * *